No. 647,563. Patented Apr. 17, 1900.
S. GASSER.
HOG CATCHER.
(Application filed Feb. 13, 1899.)
(No Model.)
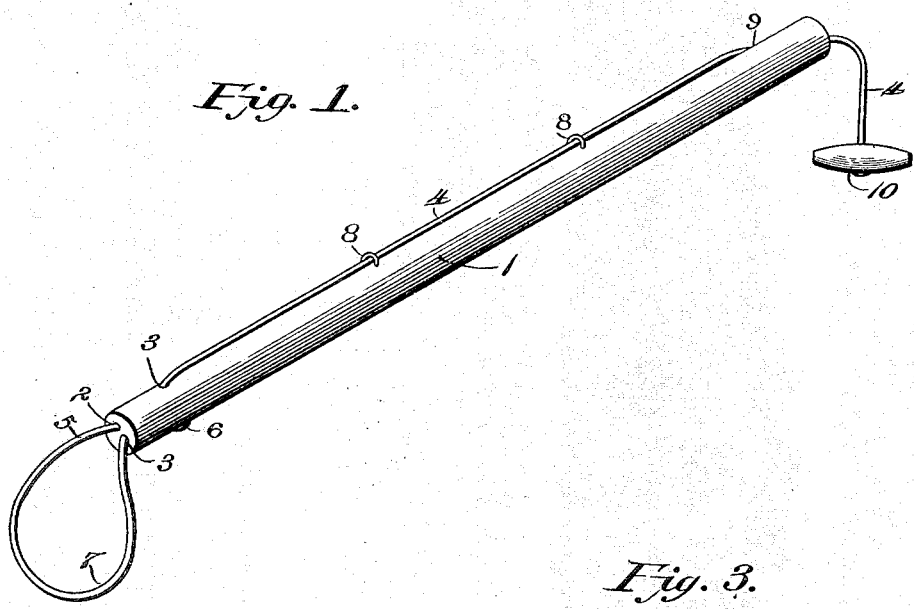
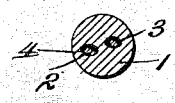
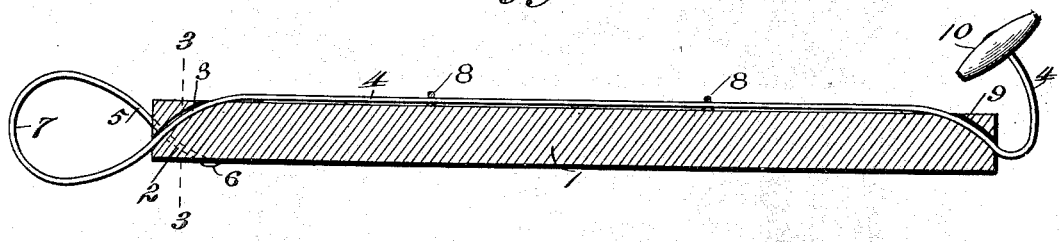
Witnesses
Clarence H. Walker.
J. F. Riley.
Sanford Gasser. Inventor
By his Attorneys,
C. A. Snow & Co.
THE NORRIS PETERS CO., PHOTO-LITHO., WASHINGTON, D. C.

UNITED STATES PATENT OFFICE.

SANFORD GASSER, OF SHERMAN, MICHIGAN.

HOG-CATCHER.

SPECIFICATION forming part of Letters Patent No. 647,563, dated April 17, 1900.

Application filed February 13, 1899. Serial No. 705,396. (No model.)

*To all whom it may concern:*

Be it known that I, SANFORD GASSER, a citizen of the United States, residing at Sherman, in the county of Wexford and State of Michigan, have invented a new and useful Hog-Catcher, of which the following is a specification.

The invention relates to improvements in hog-catchers.

The object of the present invention is to improve the construction of hog-catchers and to provide a simple, inexpensive, and efficient device which will be strong and durable and capable of engaging the snout of an animal and of securely holding the same for ringing or other purposes.

The invention consists in the construction and novel combination and arrangement of parts hereinafter fully described, illustrated in the accompanying drawings, and pointed out in the claim hereto appended.

In the drawings, Figure 1 is a perspective view of a hog-catcher constructed in accordance with this invention. Fig. 2 is a longitudinal sectional view of the same. Fig. 3 is a transverse sectional view on line 3 3 of Fig. 2.

Like numerals of reference designate corresponding parts in all the figures of the drawings.

1 designates a pole provided at its outer end with short diagonally-arranged bores or openings 2 and 3, crossing each other and adapted to receive a wire 4 or a similar flexible connection, such as a cord or rope. The outer end 5 of the wire 4 is arranged in one of the diagonal bores or openings and is secured at 6 to the exterior of the pole at the inner terminus of the bore or opening 2. The body portion of the wire passes through the bore or opening 3, crossing the end portion 5 and forming a loop, which is adapted to receive and clamp the snout of an animal, and by crossing the wire, as clearly shown in Fig. 2 of the drawings, a complete loop 7 is formed capable of securely holding an animal.

The wire 4, which extends longitudinally of the pole, passes through guides 8, arranged at intervals and consisting of staples or other suitable fastening devices. The inner end of the wire passes through a bore 9 and is provided with a grip 10, adapted to be pulled upon to draw the wire longitudinally of the pole for contracting the loop 7, formed by its outer portion. The bore or opening 9 extends diagonally across the inner end of the pole and serves as a guide for the wire, which is adapted to slide freely on the pole.

In operating the device the loop 7 is made sufficiently large to enable it to be readily placed over the snout of a hog, and it is contracted on the same by drawing the wire through the hole. As soon as the loop is contracted around the snout the pole is released, the grip or handle at the inner end of the wire being held firmly, and the greater the strain exerted on the wire the more securely will the animal be held.

The device may be employed for catching animals for ringing and other operations and also to prevent them from rutting the ground.

The invention has the following advantages: The hog-catcher, which is simple and comparatively inexpensive in construction, is adapted to be readily handled, and it is capable of engaging and firmly clamping the snout of a hog, so that the same may be easily held. The arrangement of the diagonally-disposed bores or openings at the outer end of the pole crosses the wire or other flexible connection and forms a complete and effective loop and at the same time permits the wire to slide freely to contract the loop.

Changes in the form, proportion, size, and the minor details of construction within the scope of the appended claim may be resorted to without departing from the spirit or sacrificing any of the advantages of this invention.

What is claimed is—

As an article of manufacture, a hog-catcher consisting of a pole having two perforations formed in one end thereof, said perforations entering the pole at diametrically-opposite points and crossing within the pole and opening through the end of the pole at separate points, a third perforation formed in the opposite end of the pole and entering the side of the pole and opening through the end of the pole at an acute angle to the latter, staples driven into the sides of the pole in alinement with the last-named perforation and one of the first-named perforations, and a cord having a knot at one end and having its other end passed through one of the first-named perforations and out at the end of the pole, and then returned through the second perforation and passing outwardly at the side of the pole, then through the staples and through the third perforation and passing outwardly at the end of the pole, and having a handle upon the end thus passed through the perforations, whereby the perforations of the pole may be formed with the usual bit, the cord may be readily passed through the perforations, and said cord may be drawn against the acute angle formed by the third perforation and the adjacent end of the pole to hold the cord in its operative position.

In testimony that I claim the foregoing as my own I have hereto affixed my signature in the presence of two witnesses.

SANFORD GASSER.

Witnesses:
R. D. FREDERICK,
LYDIA SOUTHWICK.